(12) United States Patent
Nagel et al.

(10) Patent No.: US 7,158,678 B2
(45) Date of Patent: Jan. 2, 2007

(54) TEXT INPUT METHOD FOR PERSONAL DIGITAL ASSISTANTS AND THE LIKE

(75) Inventors: Jens Nagel, San Francisco, CA (US); Giovanni Seni, Mountain View, CA (US)

(73) Assignee: Motorola, Inc., Schaumburg, IL (US)

( * ) Notice: Subject to any disclaimer, the term of this patent is extended or adjusted under 35 U.S.C. 154(b) by 897 days.

(21) Appl. No.: 09/909,202

(22) Filed: Jul. 19, 2001

(65) Prior Publication Data

US 2003/0016873 A1 Jan. 23, 2003

(51) Int. Cl.
*G06K 9/62* (2006.01)

(52) U.S. Cl. ............... 382/228; 345/173; 345/179; 382/187; 382/314; 715/864

(58) Field of Classification Search ........ 345/156, 345/168, 169, 173, 179, 180, 66 W, 700, 345/716, 762, 773, 808, 810–812, 816–817, 345/825, 836, 840, 863; 382/155, 161, 186–190, 382/209, 229, 280, 309, 311, 313, 315, 314; 178/18.01, 18.03, 19.01, 19.03, 19.04; 455/556.1, 455/556.2, 557; 715/531–534, 541, 864
See application file for complete search history.

(56) References Cited

U.S. PATENT DOCUMENTS

| | | | | |
|---|---|---|---|---|
| 5,455,901 A | * | 10/1995 | Friend et al. | 715/507 |
| 5,596,350 A | * | 1/1997 | Capps et al. | 345/173 |
| 5,680,480 A | * | 10/1997 | Beernink et al. | 382/187 |
| 5,682,439 A | * | 10/1997 | Beernink et al. | 382/187 |
| 5,710,832 A | * | 1/1998 | Berman et al. | 382/189 |
| 5,734,749 A | * | 3/1998 | Yamada et al. | 382/187 |
| 5,745,716 A | * | 4/1998 | Tchao et al. | 345/777 |
| 5,778,404 A | * | 7/1998 | Capps et al. | 715/531 |
| 5,881,169 A | * | 3/1999 | Henry, Jr. | 382/187 |
| 5,911,013 A | * | 6/1999 | Taniishi | 382/280 |
| 5,953,541 A | * | 9/1999 | King et al. | 710/67 |
| 5,956,021 A | * | 9/1999 | Kubota et al. | 345/179 |
| 6,005,973 A | * | 12/1999 | Seybold et al. | 382/187 |
| 6,011,554 A | * | 1/2000 | King et al. | 345/811 |
| 6,052,482 A | * | 4/2000 | Arai et al. | 382/187 |
| 6,169,538 B1 | * | 1/2001 | Nowlan et al. | 345/168 |
| 6,275,612 B1 | * | 8/2001 | Imoto | 382/189 |
| 6,295,372 B1 | * | 9/2001 | Hawkins et al. | 382/187 |
| 6,370,282 B1 | * | 4/2002 | Pavley et al. | 382/311 |
| 6,418,239 B1 | * | 7/2002 | Hullender et al. | 382/229 |
| 6,512,525 B1 | * | 1/2003 | Capps et al. | 345/762 |
| 6,642,458 B1 | * | 11/2003 | Panagrossi, III et al. | 178/18.01 |
| 6,661,409 B1 | * | 12/2003 | Demartines et al. | 345/173 |
| 6,661,920 B1 | * | 12/2003 | Skinner | 382/187 |
| 6,664,991 B1 | * | 12/2003 | Chew et al. | 345/863 |
| 6,671,170 B1 | * | 12/2003 | Webb et al. | 361/680 |
| 6,683,600 B1 | * | 1/2004 | Lui | 345/179 |
| 6,690,364 B1 | * | 2/2004 | Webb | 345/173 |

(Continued)

*Primary Examiner*—Gregory Desire

(57) ABSTRACT

A handheld device 100 with a graphical user interface for entering handwritten text 102. The handheld device includes word and character input areas 104, 106 within a designated input area 108. Icons 110, 112, 114, 116 and 118 are disposed at the right side of the handwriting user interface 102. A scroll bar 120 may be disposed at the right side of the interface display 102. An entry that begins in the word input area 104 is treated as a handwritten word. A handwritten entry that begins in the character input area 106 is treated as a single character and may be one character in character string. Handwritten character entries are each matched against all potential characters.

18 Claims, 3 Drawing Sheets

U.S. PATENT DOCUMENTS

| | | | |
|---|---|---|---|
| 6,697,639 B1 * | 2/2004 | Andress | 455/556.1 |
| 6,704,006 B1 * | 3/2004 | Cherry et al. | 345/179 |
| 6,707,942 B1 * | 3/2004 | Cortopassi et al. | 382/186 |
| 6,724,370 B1 * | 4/2004 | Dutta et al. | 345/169 |
| 6,734,881 B1 * | 5/2004 | Will | 345/811 |
| 6,751,605 B1 * | 6/2004 | Gunji et al. | 707/1 |
| 6,791,537 B1 * | 9/2004 | Shim et al. | 345/173 |
| 2003/0016873 A1 * | 1/2003 | Nagel et al. | 382/228 |

* cited by examiner

TEXT INPUT METHOD FOR PERSONAL DIGITAL ASSISTANTS AND THE LIKE

RELATED APPLICATION

The present application is related to U.S. patent application Ser. No. 09/901,878 entitled "Handwriting User Interface for Personal Digital Assistants and the Like" to Seni et al., assigned to the assignee of the present invention and filed (either coincident or prior).

BACKGROUND OF THE INVENTION

1. Field of the Invention

The present invention is related to personal digital assistants (PDAs) and more particularly to a user input interface for a PDA or the like.

2. Background Description

Portable computing devices, such as what is normally referred to as a personal digital assistant (PDA), are increasing in popularity. A typical PDA is a limited function microcomputer provided with a pressure sensitive liquid crystal diode (LCD) display (a touch pad or a touch screen) for input and output (I/O). PDAs are being adapted for wireless Internet communication, e.g., using a modem for e-mail and web browsing. Further, for text input PDAs are known that have a specialized stroke based alphabet interface, e.g., Graffiti®, a selectable on-screen QWERTY keypad, or an expansion pack keyboard.

As these portable devices become smaller and more specialized, text input has become more difficult and less practical. Typical prior art handwriting recognition software may require users to learn special characters or effect a handwriting style in order to enter text. Text input using the Graffiti® unistroke (i.e., written with a single pen trace) alphabet can be un-natural because it requires users to adhere to strict rules that restrict character shapes; text input using an on-screen QWERTY keypad is somewhat clumsy because only small reductions in size can be made to keyboards before they become awkward to use. An expansion keyboard is impractical for on-the-go input. With either, the tapping on individual characters or the typing is less desirable than being able to handwrite notes or messages. Meanwhile, the demand for PDA information exchange, e-mail and internet access requires entry and retrieval of increasing amounts of data with the handheld device.

Natural handwriting recognition (HWR) programs have been developed to add to function and usefulness to PDAs and are crucial to the growth of mobile computing in the communications field. To use handwriting recognition software, such as Transcriber (formerly known as CalliGrapher) from Microsoft Corporation, the user writes a message anywhere on the PDA screen, i.e., on top of any displayed application and system elements. Alternatively, the user can write in a designated input area using handwriting recognition software such as QuickPrintPro™ from Motorola, Inc., Lexicus division.

In order to handle unconstrained handwritten input (i.e., written in cursive style, print style, or using a combination of both) adequately, typically HWR programs such as those mentioned above, employ recognition algorithms that rely on dictionaries to constrain the search decoding space—i.e., the space of possible letter sequences that can be matched to a given input ink. Users, however, often need to write otherwise non-sensical words (e.g. an e-mail address) that are outside of a typical system dictionary. For these situations the dictionary is useless and under some circumstances using a dictionary may actually impede correct recognition. However, HWR systems that are not, at least in part, dictionary based cannot support cursive writing where character boundary information is not available. Systems that are capable of generating both in and out of dictionary recognition hypotheses simultaneously, typically exhibit lower in-dictionary accuracy.

Thus, there is a need for handwriting input user interface that includes the advantages of providing a dictionary for normal written word recognition, while at the same time allows users to enter any out-of-vocabulary character string.

BRIEF DESCRIPTION OF THE DRAWINGS

The foregoing and other objects, aspects and advantages will be better understood from the following detailed preferred embodiment description with reference to the drawings, in which.

DESCRIPTION OF PREFERRED EMBODIMENTS OF THE INVENTION

The present invention is a method of interfacing with and, a handwriting user interface (HUI) for, small (shirt pocket sized) portable devices with a touch-enabled input/output (I/O) screen, such as are commonly known as personal digital assistants (PDAs). The portable devices may be capable of wireless message transmission (such as for web browsing and/or e-mail). The user interface of the present invention is typically in software and loaded into storage in PDA. A state of the art handwriting recognition engine may be included, also in software. The present invention is particularly advantageous to entry of text, including character strings that are not necessarily words in a standard sense, e.g. acronyms, nmenonics or uniform resource locators (URLs). An entire character string, e.g. a URL, may be quickly handwritten, converted to ASCII text and, possibly, stored in the user dictionary for future reference, for example. Thus, the present invention enhances the usability, flexibility and power of the handheld device in which it is installed.

U.S. patent application No. 09/901,878 entitled "Handwriting User Interface for Personal Digital Assistants and the Like" to Seni et al., assigned to the assignee of the present invention, filed (either coincident or prior) and incorporated herein by reference, discloses a handwriting recognition user interface (HUI) which may be combined with the present invention for receiving text based handwritten entry. Handwritten entries are made at a designated input area on the touch screen, e.g., dimensions 0.30*H by W, where H and W are the height and width at the bottom of the device screen. Handwritten words are entered into the designated input area one at a time using a stylus. Recognition results are displayed in the normal display area of the screen above the designated input area.

Figure 1:
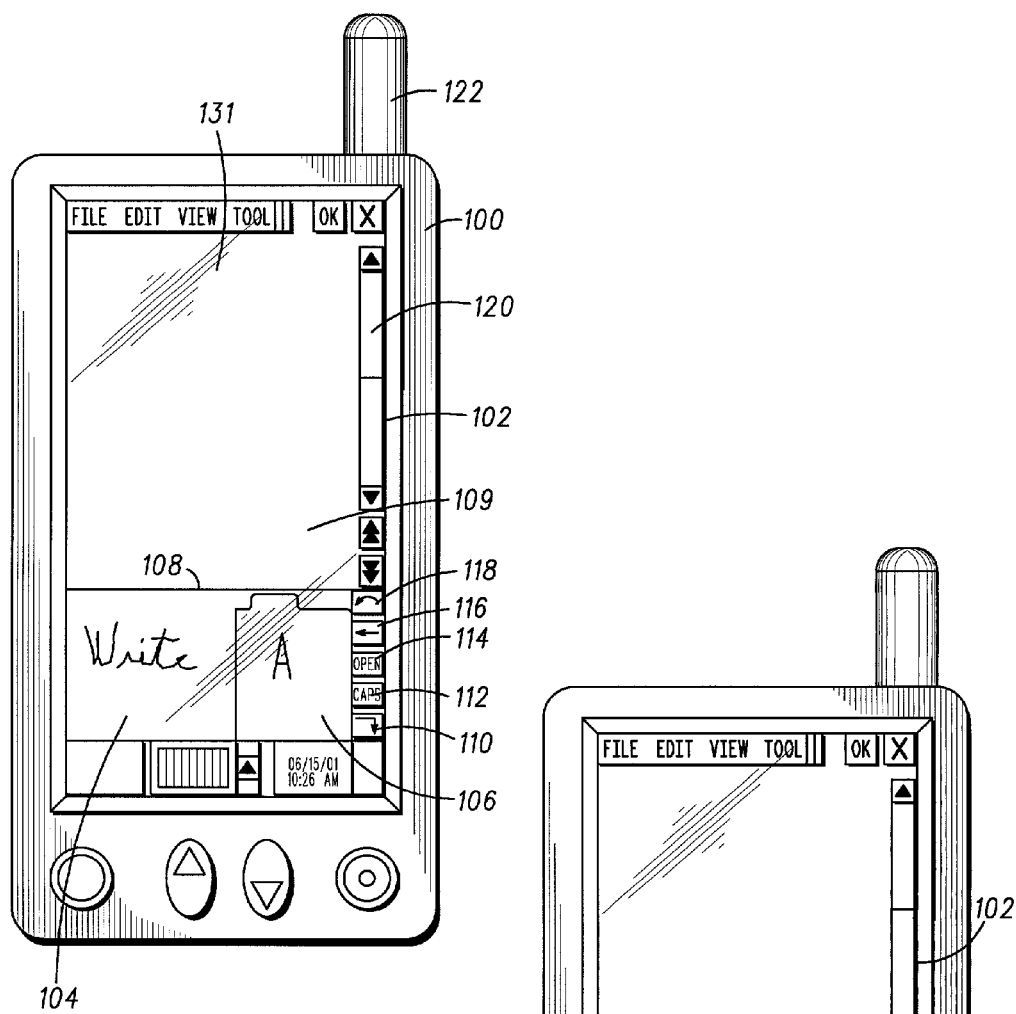
FIG. 1 shows a preferred embodiment handheld device with a user interface that includes separate handwriting input areas for words and for characters according to preferred embodiment of the present invention.

Referring to FIG. 1, a preferred handheld device 100 with a graphical user interface for entering handwritten text 102 according to the present invention is shown. Most preferably, the present invention is implemented in the user interface of Seni et al. mentioned above, further designating respective word and character input areas 104, 106 within the designated input area 108 described therein. As shown, this input area 108 preferably resides on the lower third of the screen 102 with the area 109 thereabove reserved for display of screens associated with the device's various applications. Icons 110, 112, 114, 116 and 118 are disposed, for example, at the right side of the handwriting user interface 102 adjacent the input area 108. The icons 110, 112, 114, 116 and 118 provide access to functions such as inserting a space, backspacing, deleting, capitalizing recognition result, and undoing insertion of a last word recognition result. A scroll bar 120 is disposed, for example, at the right side of the interface display 102 adjacent the screen application area 109.

An entry that begins in the word input area 104 is treated as a handwritten word and recognition proceeds as described in Seni et al. However, when a handwritten entry begins in the character input area 106, that entry is treated as a single character and may be one character in a character string. Handwritten character entries are each matched against potential characters, e.g. characters in the particular PDA character set.

The device 100 may include a communications function and, to that end in this embodiment, an antenna 122 is shown at the top of the device 100. Individual function switches buttons and other controls are disposed about the device, as is deemed appropriate for the particular device. Preferably, the device 100 runs under a state of the art operating system for such handheld devices, e.g. Windows® CE from Microsoft Corporation, Epoc® from Symbian or the Palm OS® from Palm, Inc.

The preferred embodiment HUI of the present invention employs a handwriting recognition engine capable of recognizing handwritten words, written using any combination of writing styles (i.e., cursive, print, and mixed). Preferably, the recognition engine is the QuickPrintPro™ engine from Motorola, Inc., Lexicus Division. The recognition engine typically includes a main word dictionary and one or more user dictionaries to which the user may add words to supplement the main dictionary. User dictionaries may include, for example, a word list, an e-mail address book, a bookmark/shortcut list, etc.

Figure 2A:
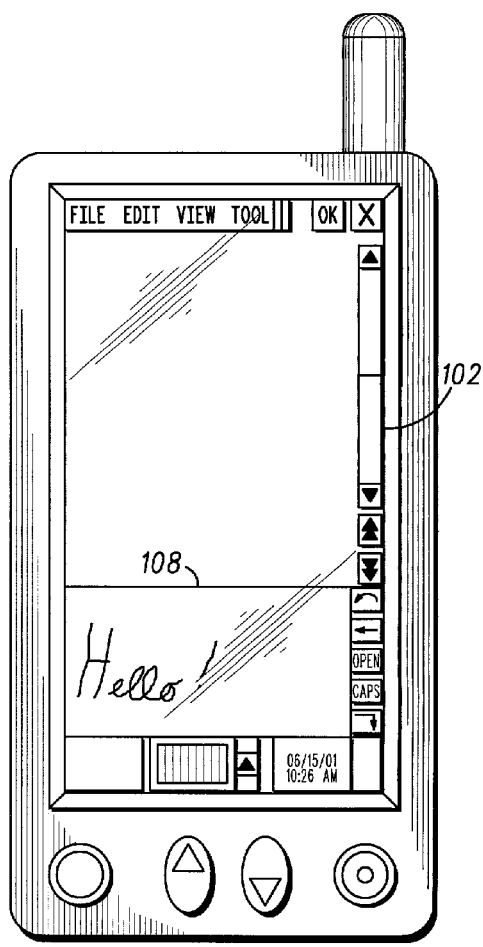
FIGS. 2A–B show handwritten text entry and recognition, wherein handwritten word entry begins in the word input area of the user interface.
Figure 2B:
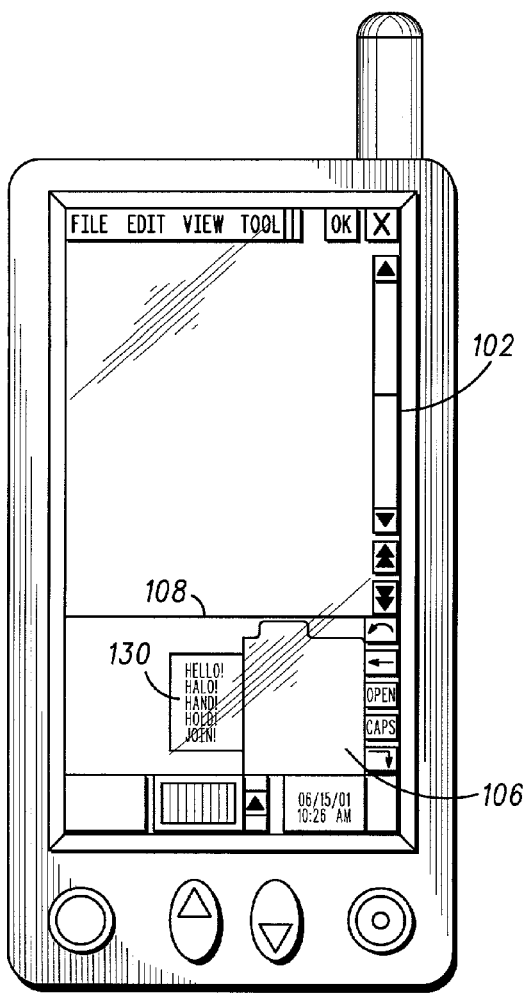

FIGS. 2A–B show handwritten text entry, wherein text entry begins in the word input area 104 in FIG. 2A causing the entry to be recognized as a handwritten word and treated accordingly. To make a wider writing area available for word entry, upon first pen-down within the word input area, the character input area is removed and subsequently restored after completion of the word recognition operation. Thus, in FIG. 2B after entry is complete, word candidates are presented in a pop-up list 130. Location of the pop-up list is not critical and so, to conserve space on the screen 102, the pop-up word list 130 can be displayed in the input area 108, and more specifically in the text or word input area 104 thereof.

The recognition engine compares a handwritten input word against all words contained in the main dictionary and the user dictionary. A probability score is generated by the recognition engine for each dictionary word which is indicative of the likelihood that the handwritten word matches that particular dictionary word. Based on each words' probability score, a list of likely matches is collected. From the recognition results, the handwriting recognition engine generates a confidence score for the one word (the primary word) with the highest probability score. If that confidence score exceeds a preselected confidence threshold, it is an indication that the recognition engine has correctly recognized the written word and that the primary word choice is in fact correct.

So, if the confidence level is above the preselected threshold, the HUI automatically loads a primary word choice into the device's input buffer for delivery to the active application. Thus, in the example of FIGS. 2A–B, that word may be automatically inserted into a displayed stream of recognized text such as in the upper area 131 of the display screen 102 in the application area 109 thereof. Otherwise, when the confidence level of the primary word choice is below the confidence threshold, an indication is provided that the recognition engine cannot find a likely candidate, e.g., displaying "???" or something similar into the device's input buffer. If the correct word is not in the pop-up list the user can either rewrite the word or "back-off" to character-by-character input in the character writing area.

Handwritten text input entry may be provided in unrestricted mixed style that includes cursive (i.e., contiguous characters in each word touching or connected), pure print (i.e., characters in every word disconnected and do not touch), pseudo-print (at most pairs of characters in words touch) or any combination thereof. Thus, for mixed entry a user is not restricted to cursive, print or pseudo-print entry. The user may designate that text entry is to be in one mode only, i.e., cursive, pure print or pseudo print. Thus, the number and complexity of created character alternatives possible are reduced for the handwriting recognition engine, increasing both recognition accuracy and speed.

Figure 3A:
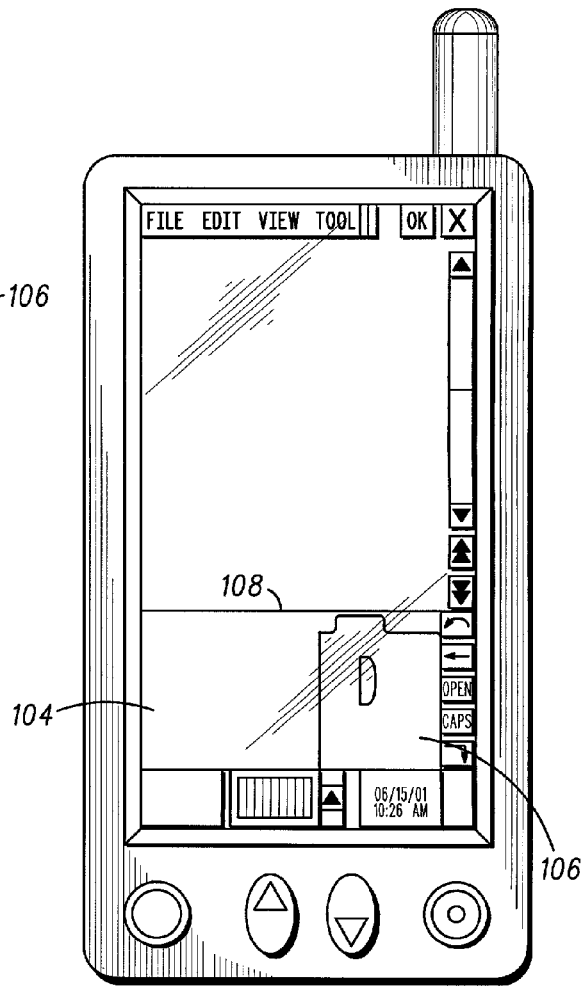
FIGS. 3A–B show individual character entry and recognition in a character entry area of the user interface.
Figure 3B:
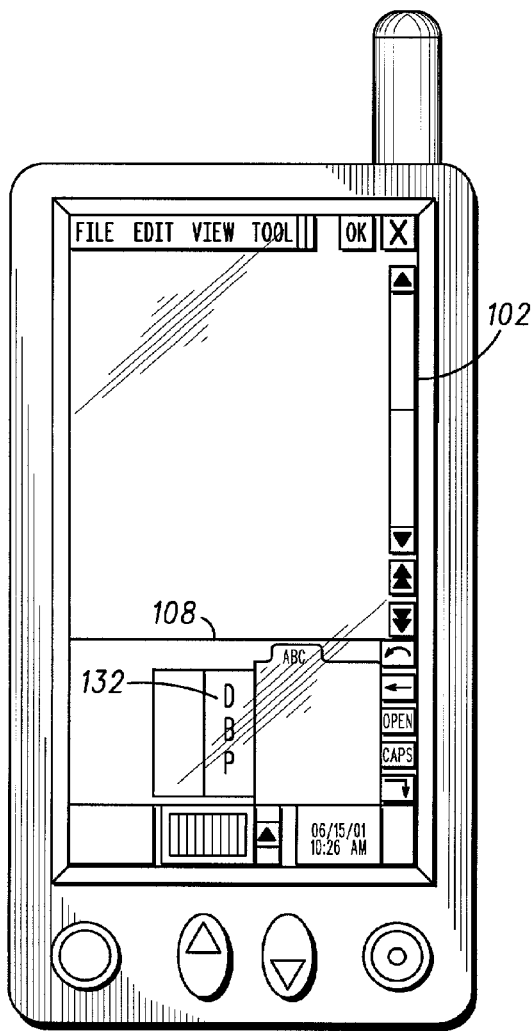

FIGS. 3A–B show individual character entry wherein characters are entered in the character input area 106. Individual characters may be entered as part of a non-textual string (e.g., an e-mail address) or to correct a misspelled previously entered word identified by tapping on the word to select it, for example. Preferably the character writing area is defined as "modal" such that the possibilities of the user's character input are selectively limited in order to increase recognition accuracy. Selectable modes may include "digits," "symbols," "upper-case letters" and "lower-case letters" modes.

Entry begins in the character input area 106 in FIG. 3A, causing an entry to be recognized as an individual handwritten character and treated accordingly. Compared to word recognition, individual character recognition is a relatively simple task for a typical state of the art handwriting recognition engine. Further, to increase the likelihood of presenting the user with the correct character, a pop-up list 132 is provided as shown in FIG. 3B, listing likely characters in descending order of likelihood. This character list 132 can be disposed in the same space as where the word list 130 would be when it is displayed, i.e. in the area 104 directly adjacent area 106. As each character is accepted, it is inserted at the end of an output string of characters (not shown) displayed above the input area 108. Optionally, a string of characters entered using the character writing area can be logged and automatically added to the user dictionary for future writing in the word input area. If the character is being provided to correct a misspelled or misrecognized word, then the recognized character(s) are inserted at a selected position into the word, e.g., hap_y.

Figure 4:
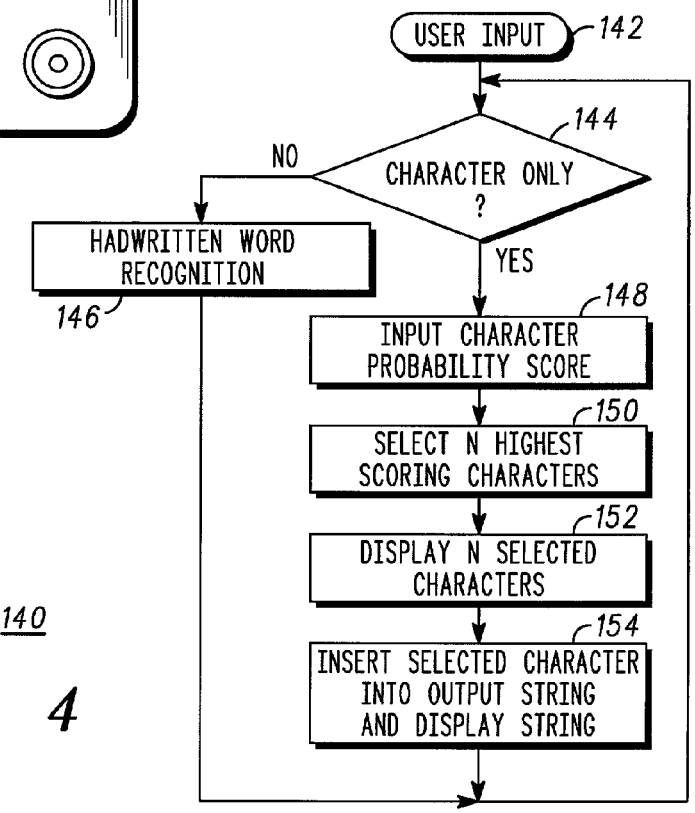
FIG. 4 is an example of a flow diagram for implementing the handwriting user interface of the preferred embodiment of the present invention.

FIG. 4 is an example of a flow diagram of a method 140 for implementing the handwriting user interface of the preferred embodiment of the present invention. First, in step 142 a handwritten entry is made into the designated screen input area. In step 144 a check is made to determine whether the handwritten entry is in the text input area 104 or character input area 106. If the handwritten entry is in the text input area 104 in step 146, the handwriting recognition engine matches the handwritten input as described in Seni et al. Otherwise, in step 148 a probability score is generated for each possible character to indicate the likelihood that the input character is that particular character. In step 150, the highest scoring characters are identified. In step 152 the top scoring characters are displayed in a pop-up list 132. In step 154, the user selects the correct character and that selected character is inserted into or at the end of the character string in the input buffer and displayed above the input area 108. Then, returning to step 142, the user is allowed to continue character or word entry.

Thus, the present invention provides a simple, easy to use interface for entering non-textual character strings in a handwriting enabled shirt-pocket sized device.

While the invention has been described in terms of preferred embodiments, those skilled in the art will recognize that the invention can be practiced with modification within the spirit and scope of the appended claims.

We claim:

1. A handwriting recognition user interface (HUI) for entering handwritten text and handwritten individual characters on a portable device having a touch-enabled input screen, said HUI comprising:
   a text input area residing in a predetermined portion of a touch-enabled input screen;
   a word entry area in said text input area adapted to receive handwritten words;
   a character entry area separated from the word entry area in said text entry area adapted to receive handwritten characters; and
   a recognition engine configured to recognize handwritten words written in the text input area and handwritten individual characters written in the word entry area.

2. A HUI as in claim 1 including memory storing one or more dictionaries, said recognition engine matching each handwritten word against words in said one or more dictionaries and providing a probability score indicative of the likelihood that each given word is a correct interpretation of the handwritten input word.

3. A HUI as in claim 1 further comprising:
   a pop-up word list displaying words identified by said recognition engine as being likely matches for a handwritten word entry; and
   a pop-up character list displaying characters identified by said recognition engine as being likely matches for a character entry.

4. A HUI as in claim 3 further comprising one or more action icons on a side of said touch-enabled screen.

5. A HUI as in claim 4 wherein selecting one of said icons selects an editing operation selected from the group consisting of: inserting a space, backspacing, deleting, capitalizing recognition result, and undoing insertion of a last word recognition result.

6. A HUI as in claim 5 wherein a stylus entry outside of said text input area selects one or more characters of a previously entered word, whereby characters are entered into said character entry area, entered said characters replacing said selected one or more characters.

7. A personal digital assistant (PDA) capable handwritten text entry, said PDA comprising:
   a touch-enabled input screen;
   a recognition engine capable of recognizing handwritten words and characters;
   one or more dictionaries containing a plurality of words;
   a communication port for communicating with a remotely connected computer, data being selectively transferred between said remotely connected computer and said PDA;
   a local storage storing applications to be run on said PDA, said main dictionary and application data;
   a plurality of switches providing manual input to said PDA; and
   a handwriting recognition user interface (HUI) comprising:
      a text input area residing in a lower portion of said touch-enabled input screen, said text entry area including a word entry area and a character entry area, handwritten words being entered into said word entry area a single word at a time, recognition results being displayed on said touch enabled screen outside of said text input area, entries made in said word entry area being handwritten word entries and entries beginning in said character entry area being characters,
      a pop-up word list listing words identified by said recognition engine as likely matches to a handwritten word,
      a pop-up character list listing characters identified by said recognition engine as likely matches to a character entry, and
      one or more action icons displayed together on a side of said touch-enabled screen and providing access to editing functions for editing previously recognized displayed words.

8. A PDA as in claim 7, wherein said text input area occupies at least one third of said touch-enabled screen and spans said touch-enabled screen's width.

9. A PDA as in claim 8 wherein said communications port is a wireless communications port, e-mail messages being communicated over said wireless communications port responsive to an e-mail address entered a character at a time in said character entry area.

10. A PDA as in claim 8 wherein said applications stored in said local storage includes a browser application uniform resource locators (URLs) being selectively provided to said browser one character at a time from said character entry area.

11. A PDA as in claim 8 wherein selecting one of said button icons selects an editing operation selected from the group consisting of: inserting a space, backspacing, deleting, capitalizing recognition result, and undoing automatic insertion of a last recognition result.

12. A PDA as in claim 11 wherein a stylus entry at a previously entered displayed word is recognized as selecting one or more characters of said previously entered displayed word, whereby characters are entered into said character entry area, entered said characters replacing said selected one or more characters.

13. A method for providing textual information to a computer, said method comprising the steps of:
   a) receiving a handwritten textual entry from a text input screen area;
   b) determining whether said received handwritten textual entry was made in a word entry area or in a character entry area on the screen input area; and c) passing handwritten textual entries made in the word entry area to a handwriting recognition engine to be treated as handwritten words, and passing handwritten textual entries made in the character entry area to the handwriting recognition engine to be treated as characters.

14. A method as in claim 13 further comprising:
d) receiving a probability score from said recognition engine, said probability score indicating a likelihood that a corresponding stored entry matches said received entry, said stored entry being a dictionary entry for a handwritten word entry and a character for a character entry; and
e) displaying a list of one or more stored entries in descending order according to said probability score.

15. A method as in claim 13 further comprising repeating steps a–e for a plurality of character entries, said plurality of character entries being concatenated to form a character string.

16. A method as in claim 15 wherein said character string is a uniform resource locator (URL).

17. A method as in claim 15 wherein said character string is an e-mail address.

18. A method as in claim 15 wherein said character string is stored in one of said one or more dictionaries for subsequent word recognition.

* * * * *